US012560711B2

(12) United States Patent
Purohit et al.

(10) Patent No.: US 12,560,711 B2
(45) Date of Patent: Feb. 24, 2026

(54) AUDITORY-BASED ENVIRONMENT MONITORING

(71) Applicant: INTERNATIONAL BUSINESS MACHINES CORPORATION, Armonk, NY (US)

(72) Inventors: Viswas Purohit, East Amherst, NY (US); Mohsen Nasseri, East Meadow, NY (US); Hemant Kumar Sivaswamy, Pune (IN)

(73) Assignee: International Business Machines Corporation, Armonk, NY (US)

( * ) Notice: Subject to any disclaimer, the term of this patent is extended or adjusted under 35 U.S.C. 154(b) by 132 days.

(21) Appl. No.: 18/456,834

(22) Filed: Aug. 28, 2023

(65) Prior Publication Data

US 2025/0076497 A1 Mar. 6, 2025

(51) Int. Cl.
*G01S 15/62* (2006.01)
(52) U.S. Cl.
CPC .................................... *G01S 15/62* (2013.01)
(58) Field of Classification Search
CPC ................................. G01S 15/66; G01S 15/62
See application file for complete search history.

(56) References Cited

U.S. PATENT DOCUMENTS 3,967,260 A * 6/1976 Massa ................ G08B 13/1627
367/901
4,254,483 A * 3/1981 Vidovic ............. G08B 13/1627
340/508

4,319,349 A * 3/1982 Hackett ................ G01S 15/523
367/136
4,578,674 A * 3/1986 Baker ...................... G06F 3/043
398/115
4,625,199 A * 11/1986 Pantus .................. G01S 13/862
340/565
5,023,847 A * 6/1991 Lee ........................... G01H 3/12
367/136
5,068,835 A * 11/1991 Reed ...................... G01B 17/06
367/87
5,184,330 A * 2/1993 Adams .................. G01S 7/6245
367/111

(Continued)

FOREIGN PATENT DOCUMENTS

CN 111038671 A * 4/2020
EP 189953 A * 8/1986 ........... G01S 13/862

(Continued)

OTHER PUBLICATIONS

Author Unknown, "Audio Analysis With Machine Learning: Building AI-Fueled Sound Detection App", AltexSoft, May 12, 2022, https://www.altexsoft.com/blog/audio-analysis/, 22 pages.

(Continued)

*Primary Examiner* — Daniel Pihulic
(74) *Attorney, Agent, or Firm* — Kristofer Haggerty

(57) ABSTRACT

A method, computer system, and a computer program product for environment monitoring. Exemplary embodiments may include emitting one or more soundwaves within an environment, detecting the emitted one or more soundwaves, and identifying motion of an object within the environment based on an analysis of the detected one or more soundwaves.

17 Claims, 9 Drawing Sheets

(56) References Cited

U.S. PATENT DOCUMENTS

| | | | | |
|---|---|---|---|---|
| 6,813,220 | B2 * | 11/2004 | Hicks | G01S 7/523 367/136 |
| 7,535,351 | B2 | 5/2009 | Reymond | |
| 8,976,056 | B2 * | 3/2015 | Broman | G01S 13/862 342/25 R |
| 9,197,976 | B2 | 11/2015 | Park | |
| 9,685,071 | B1 | 6/2017 | Fu | |
| 9,811,986 | B2 | 11/2017 | Loidreau | |
| 10,032,351 | B2 | 7/2018 | Showen | |
| 10,127,818 | B2 | 11/2018 | Mandeville-Clarke | |
| 10,497,381 | B2 | 12/2019 | Short | |
| 11,043,094 | B2 | 6/2021 | Ghourchian | |
| 11,470,427 | B2 | 10/2022 | Wexler | |
| 11,496,842 | B2 | 11/2022 | Wexler | |
| 11,638,103 | B2 | 4/2023 | Rosenwein | |
| 2006/0018198 | A1 * | 1/2006 | McDonald | G01S 15/876 367/136 |
| 2007/0133351 | A1 * | 6/2007 | Taylor | G01S 5/18 367/136 |
| 2015/0268338 | A1 * | 9/2015 | Freiburger | B60Q 1/381 342/107 |
| 2018/0317881 | A1 * | 11/2018 | Astigarraga | A61B 8/0891 |
| 2020/0007357 | A1 * | 1/2020 | Kim | G01S 15/8993 |
| 2020/0305842 | A1 * | 10/2020 | Rosenzweig | G01S 15/8952 |
| 2020/0349718 | A1 * | 11/2020 | Dang | G01S 17/58 |
| 2022/0026569 | A1 * | 1/2022 | Plesner | G01S 15/62 |
| 2024/0070251 | A1 * | 2/2024 | Maizels | G10L 13/02 |
| 2024/0183979 | A1 * | 6/2024 | Goldberg | A61B 5/1126 |
| 2025/0076497 | A1 * | 3/2025 | Purohit | G01S 15/62 |

FOREIGN PATENT DOCUMENTS

| | | | | | |
|---|---|---|---|---|---|
| EP | 2740408 | B1 * | 1/2017 | | A61B 8/06 |
| FR | 2908546 | A1 * | 5/2008 | | G06K 9/00771 |
| KR | 101794733 | B1 | 11/2017 | | |
| WO | WO-2009142610 | A1 * | 11/2009 | | B66B 13/26 |
| WO | WO-2022185025 | A1 * | 9/2022 | | A61B 5/1126 |
| WO | WO-2024018400 | A2 * | 1/2024 | | A61B 5/1176 |

OTHER PUBLICATIONS

Disclosed Anonymously, "Air-Molecule-Vibration Based Noise Map", IP.com, IP.com No. IPCOM000267168D, IP.com Publication Date: Sep. 30, 2021, 12 pages.

Disclosed Anonymously, "Dynamic alert and notification system for better human interactions with devices", IP.com, IP.com No. IPCOM000263348D, IP.com Publication Date: Aug. 21, 2020, 4 pages.

Disclosed Anonymously, "Sound Control Based on Environmental Parameters", IP.com, IP.com No. IPCOM000263582D, IP.com Publication Date: Sep. 14, 2020, 5 pages.

Disclosed Anonymously, "Who Is Speaking Here (WISH)—Method for detecting the co-location of participants during a teleconference", IP.com, IP.com No. IPCOM000263672D, IP.com Publication Date: Sep. 24, 2020, 8 pages.

Runz et al., "MaskFusion: Real-Time Recognition, Tracking and Reconstruction of Multiple Moving Objects", arXiv:1804.09194v2 [cs.CV] Oct. 22, 2018, 11 pages.

Sindhia et al., "Efficient Detection and Tracking of Multiple Moving Objects in Temporal Domain", 2016 Fifth International Conference On Recent Trends in Information Technology, IEEE, Apr. 2016, 6 pages.

* cited by examiner

100

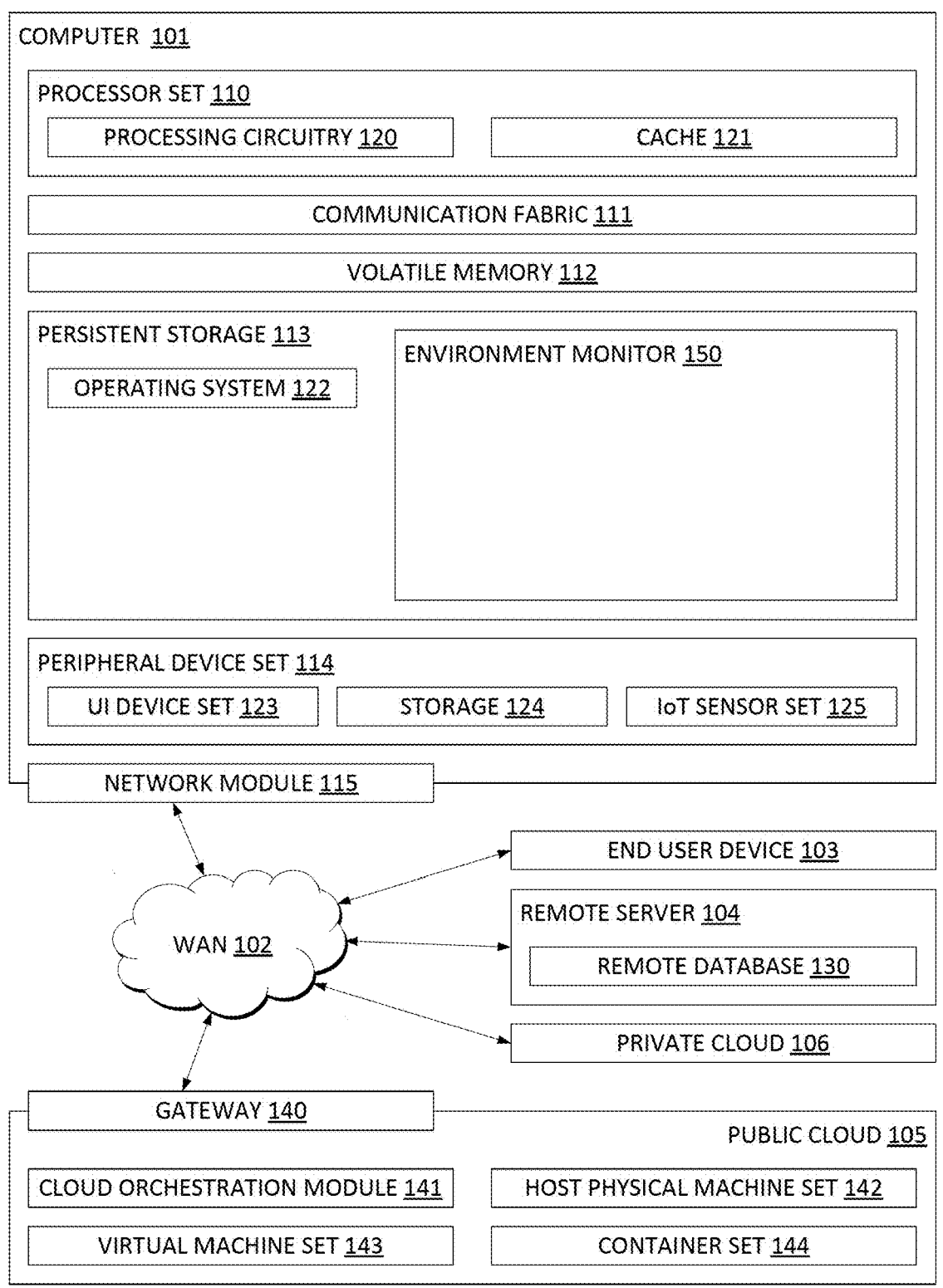

COMPUTER 101

PROCESSOR SET 110

PROCESSING CIRCUITRY 120      CACHE 121

COMMUNICATION FABRIC 111

VOLATILE MEMORY 112

PERSISTENT STORAGE 113

OPERATING SYSTEM 122

ENVIRONMENT MONITOR 150

PERIPHERAL DEVICE SET 114

UI DEVICE SET 123     STORAGE 124     IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141     HOST PHYSICAL MACHINE SET 142

VIRTUAL MACHINE SET 143     CONTAINER SET 144

START

COLLECT TRAINING DATA

202

LABEL TRAINING DATA

204

PREPROCESS TRAINING DATA

206

EXTRACT FEATURES FROM DATA

208

SELECT PATTERN MATCHING ALGORITHM TO APPLY TO EXTRACTED FEATURES

210

GENERATE MODEL BASED ON ALGORITHM OUTPUT

212

END

300

START

INITIALIZATION

302

AUDITORY SIGNAL EMISSION

304

AUDITORY SIGNAL DETECTION

306

SIGNAL PREPROCESSING

308

FEATURE EXTRACTION

310

APPLY MODEL

312

MOTION DETECTION

314

ALERT GENERATION

316

RESPONSE ACTIVATION

318

PERFORM POST-INCIDENT ANALYSIS

320

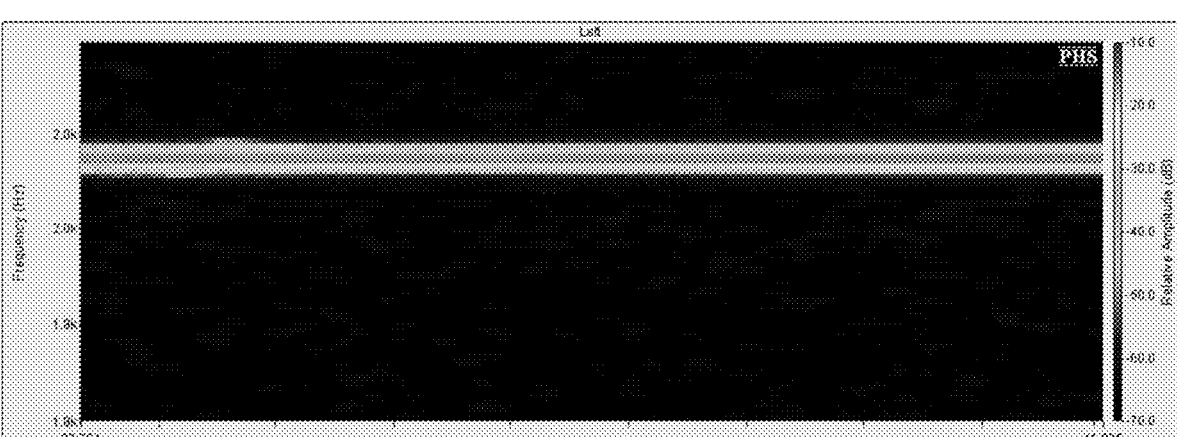
602
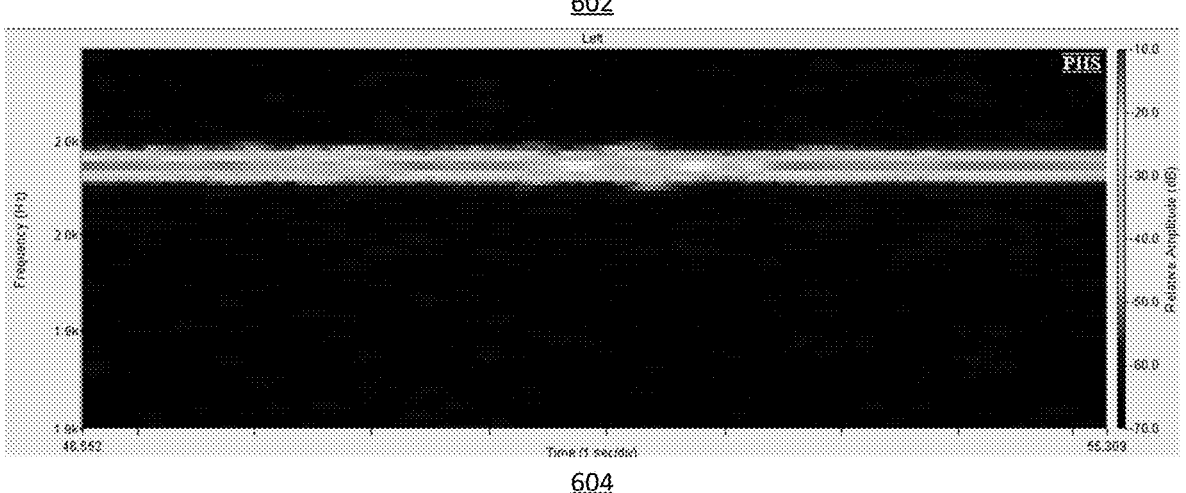
604
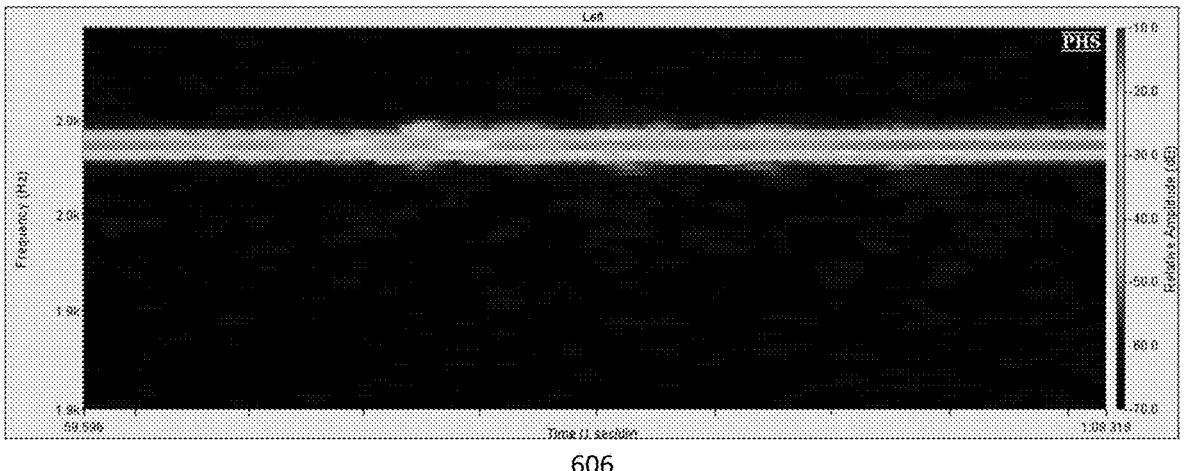
606
FIG. 6A

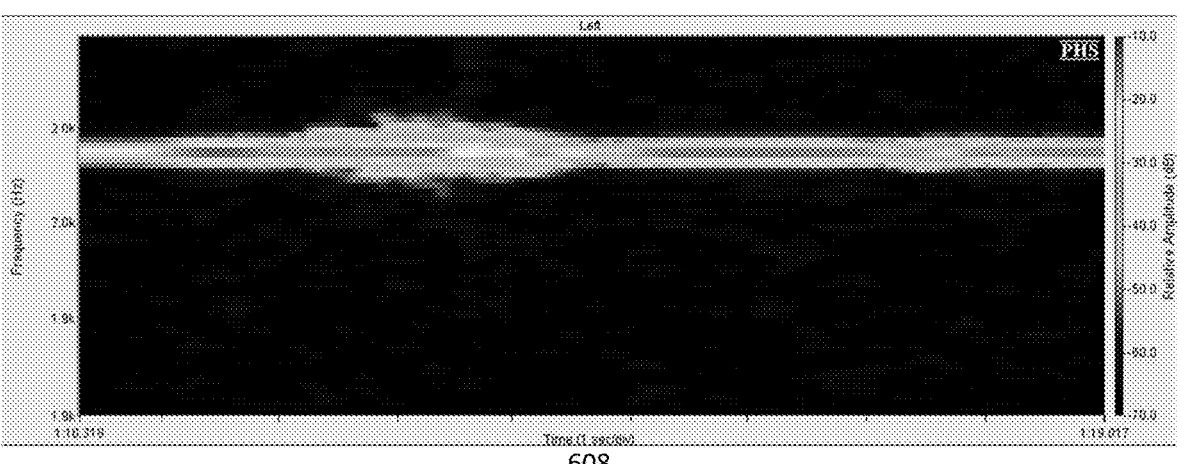
608
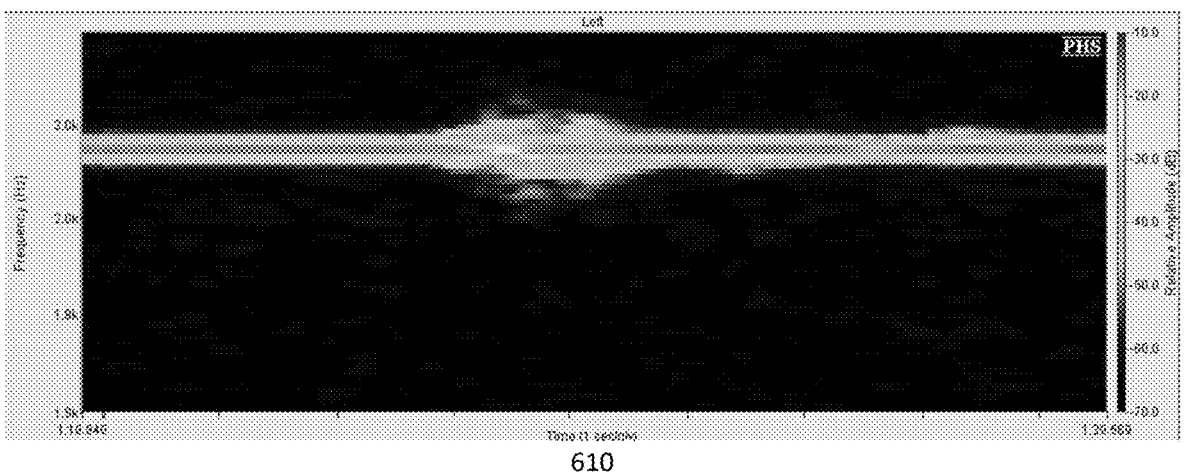
610
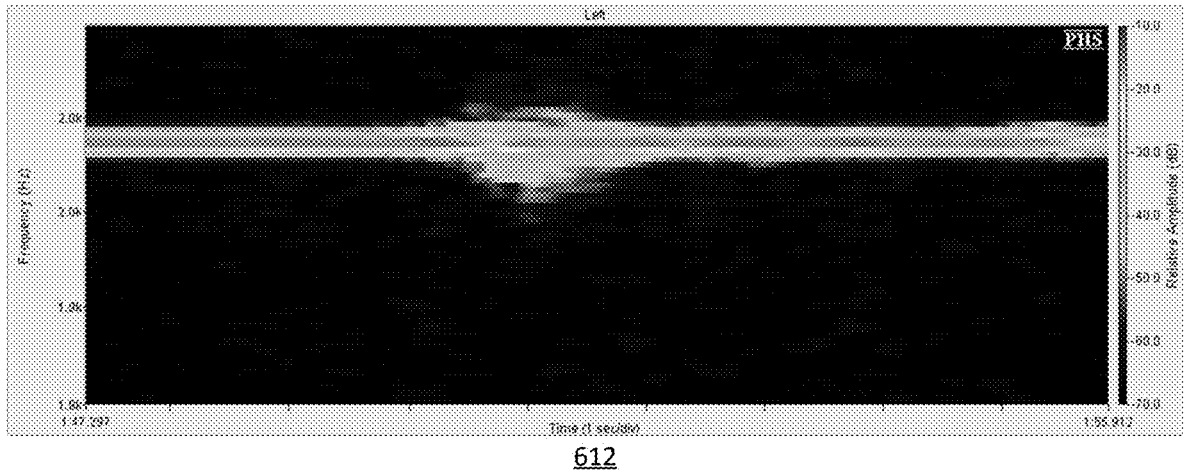
612
FIG. 6B

702

704

706

AUDITORY-BASED ENVIRONMENT MONITORING

BACKGROUND

The exemplary embodiments relate generally to environment monitoring, and more particularly to environment monitoring via auditory signals.

Environment monitoring and motion detection are typically accomplished via video signals, for example using a camera. However, video signals have drawbacks that include being subject to darkness and requiring a line of sight. Such constraints often limit the effectiveness of video-based systems in varying environmental conditions or complex scenarios. In addition to the prohibitive costs associated with implementing a high-resolution video camera system, video-based monitoring may also invoke privacy concerns because of the visual information captured.

SUMMARY

Exemplary embodiments disclose a method, a structure, and a computer system for environment monitoring. The exemplary embodiments may include emitting one or more soundwaves within an environment, detecting the emitted one or more soundwaves, and identifying motion of an object within the environment based on an analysis of the detected one or more soundwaves.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 1 depicts an exemplary block diagram depicting the components of computing environment 100, in accordance with the exemplary embodiments.

FIG. 6A-6B depict spectrum analyses of motion detected between an emitter and a detector, in accordance with the exemplary embodiments.

DETAILED DESCRIPTION

Figure 2:
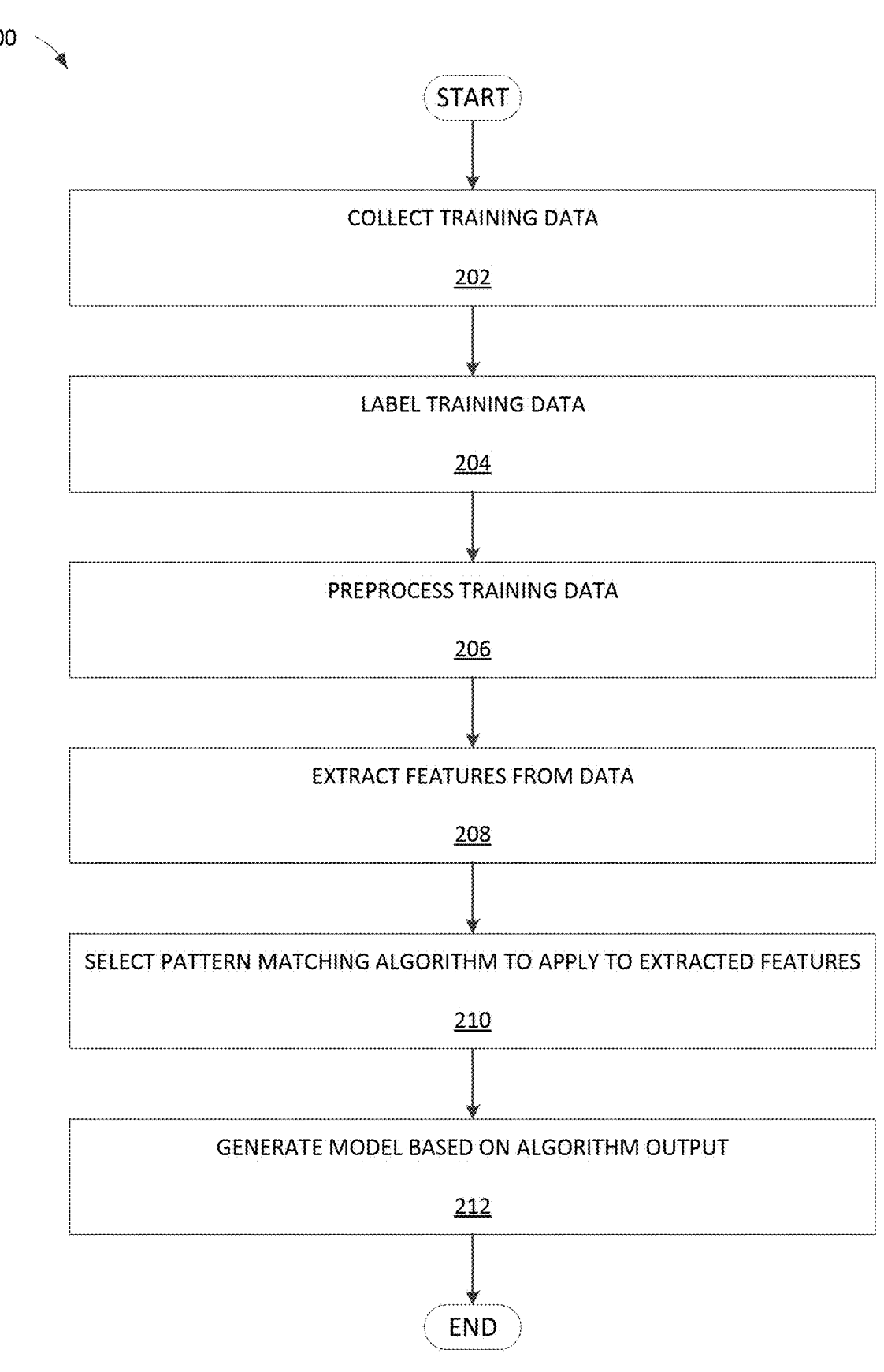
FIG. 2 depicts exemplary flowchart 200 illustrating a training phase of a model implemented by environment monitor 150 of computing environment 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

FIG. 1 depicts an exemplary block diagram depicting the components of computing environment 100, in accordance with the exemplary embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as environment monitor 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, for illustrative brevity. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication Fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile Memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open-source Portable Operating System Interface-type operating systems that employ a kernel. The code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user, and may take any of the forms discussed above with respect to computer 101. The EUD 103 may further include any components described with respect to computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer

101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 depicts exemplary flowchart 200 illustrating the operations of environment monitor 150 of computing environment 100, in accordance with the exemplary embodiments.

Environment monitoring and motion detection are typically accomplished via the use of visual-based data, for example that captured by a camera or video camera. Though widely used, environment monitoring via the use of visual-based data has its drawbacks. For example, implementing a high-resolution camera system may be cost prohibitive depending on application. Moreover, visual-based monitoring can only collect data within its line of sight. The data obtained along the line of sight is subject to light levels and distance to a target, where the data is typically reduced at low light levels and as distance to a target increases. Such constraints often limit the effectiveness of visual-based systems in varying environmental conditions or complex scenarios. Further, visual-based monitoring may invoke privacy concerns based on the visual-based data being collected.

A sound-based environment monitoring system addresses these challenges by utilizing both audible and inaudible frequencies to detect, identify, and track objects or people. Unlike visual-based environment monitoring, this approach provides robustness to lighting conditions, preserves privacy, and offers potential cost advantages. By exploiting the physics of soundwave propagation, reflection, and scattering, along with leveraging AI algorithms for soundwave analysis, the invention offers a novel solution that broadens the applicability and effectiveness of environmental monitoring in contexts such as security, surveillance, and search and rescue operations, where traditional methods fall short.

Using audio-based signals as probes, the present invention enables the detection, identification, and tracking of multiple objects, such as humans, animals, or machines, within an environment. By emitting within the environment an audible frequency (e.g., 2 kHz) and an inaudible infrasound frequency, the system can analyze changes in the sound signature caused by the movement of the objects while minimizing disturbance. The changes in sound signature, which are a result of the object crossing between a sound emitter and a sound detector, provide valuable insights into the location, movement, and even characteristics of the objects. As noted above, this enables real-time monitoring and analysis of objects and an environment, which can be useful in various applications such as security, surveillance, patient monitoring, search and rescue operations, and even in mapping complex environments.

Several known solutions exist for mapping complex environments. Some of these include:

LIDAR (Light Detection and Ranging): LIDAR systems use laser light to measure distances and create high-resolution, three-dimensional maps of the environment. It is widely used in autonomous vehicles, robotics, and geographical surveying.

Sonar (Sound Navigation and Ranging): Sonar systems use soundwaves to detect and locate objects in the environment. Primarily used underwater, sonar systems can also be used in air for mapping and navigation.

Computer Vision and Image Processing: By processing images or videos captured by cameras, computer vision algorithms can detect objects, estimate their position, and reconstruct the scene in 3D. This technology is used in robotics, drones, and augmented reality applications.

Infrared imaging: Infrared cameras detect heat emitted by objects and can create a thermal map of an environment.

This technology is particularly useful in low-visibility conditions or for detecting objects that emit heat, such as humans or animals.

Radar (Radio Detection and Ranging): Radar systems use radio waves to detect objects and measure their distance, direction, and speed. Widely used in aviation, marine, and automotive applications, radar can also be used for mapping complex environments.

GPS (Global Positioning System) and GNSS (Global Navigation Satellite System): These satellite-based systems provide accurate location information and can be combined with other sensors or technologies to map complex environments.

However, each of these aforementioned methodologies has their drawbacks, and sound-based environment mapping offers advantages over them, particularly in specific scenarios or applications. Some of these advantages include:

Robustness to lighting conditions: Unlike vision-based systems, sound-based mapping is not affected by varying lighting conditions, such as darkness, shadows, or glare. This makes it suitable for use in environments with poor or changing visibility.

Penetration through certain materials: Soundwaves can penetrate through some materials that are opaque to light or radio waves, such as foliage, fabric, or thin walls, potentially allowing for more comprehensive mapping in certain situations.

Less interference with other devices: Sound-based systems may cause less interference with other electronic devices compared to radio-based systems like radar, which can be an advantage in environments with numerous electronic devices or sensitive equipment.

Privacy preservation: Unlike camera-based systems, sound-based mapping does not capture visual information, which can be a significant advantage in applications where privacy is a concern.

Passive detection: In some cases, sound-based systems can rely on ambient noise or sound generated by the objects themselves, allowing for passive detection without actively emitting signals. This can be useful for stealthy or unobtrusive monitoring.

Dual-frequency approach: Audible and inaudible frequencies can be used simultaneously or separately, enhancing the system's versatility and effectiveness in various environments and conditions. The inaudible frequency ensures minimal disturbance to humans, while the audible frequency can provide additional information for the AI to analyze.

Unique audio signatures: The system's ability to identify and track individuals based on their unique audio signatures adds an extra layer of information that may not be available in other mapping solutions. This can enhance the accuracy and effectiveness of the system in applications like security and surveillance.

Lower cost: Sound-based systems, especially those using audible frequencies, can be more affordable than LIDAR, radar, or high-resolution camera systems, making them accessible to a broader range of users and applications.

In view of the advantages described above, one skilled in the art may appreciate that the present invention improves upon the technical field of environment monitoring through use of auditory signals. How the present invention realizes these advantages will now be described in greater detail.

In embodiments, environment monitor 150 may be implemented via the installation of one or more physical devices, for example sound emitters and sound detectors, as well as installation of corresponding software. The physical devices may be installed within an environment in which monitoring (or motion detection) is desired while the software may be installed onsite, for example end user device 103, and/or offsite via a network connection, for example in a client-server architecture. Environment monitor 150 may be configured to report environmental monitoring information, such as detected motion, to a local administrator, such as an onsite office or security guard, and/or an offsite administrator.

In embodiments, the software may include an environment monitoring model ("model") capable of detecting motion based on analyzing changes in sound signatures transmitted between sound emitters and sound detectors. Environment monitor 150 may pretrain the model prior to implementing the system within an environment. Reference is now made to FIG. 2 which depicts flowchart 200 illustrating the generation of the model.

Environment monitor 150 may collect training data (step 202). The training data may include soundwave data transmitted between one or more soundwave emitters and one or more soundwave detectors. The soundwave data may be collected from environments of various size and shape, in various emitter-detector orientations, and during periods with and without movement, for example during motionless periods and while objects traverse the environment. The soundwave data may further be collected at different audible and inaudible frequencies and may include data supporting passive detection mode described above in which the operational noise emitted by devices within an environment is used for environment monitoring rather than actively emitting sound from the sound emitters. In embodiments, the training data may be labeled to associate the objects, their characteristics, and their movements with the corresponding changes in soundwave signatures/characteristics. These motions (or lack thereof) result in the sound detectors detecting different soundwave signatures that may each be correlated with the known labels once the model is generated.

To illustrate the differences in soundwave signatures based on object movement in between a soundwave emitter and a soundwave detector, reference is now made to FIG. 6 depicting six spectrum analyses. These analyses depict soundwave signatures of a 2000 Hz sound emission received at a detector situated two meters away from the emitter. Reference character 602 depicts a baseline spectrum analysis with no interruption (i.e., no object motion) while analyses 604-612 depict a spectrum analysis of soundwaves in which a six-foot-tall person walks between the sound emitter and the detector at: 604) 1 km/hr, 606) 2 km/hr, 608) 4-5 km/hr, 610) 7-8 km/hr, and 612) 10 km/hr. As illustrated by FIG. 6, the spectrum analysis varies based on the speed at which the person walks between the source and emitter. While FIG. 6 shows an example of how speed alone may vary a spectrum analyses, these spectrum analyses may further vary based on position and characteristics of the object passing between the emitter and detector.

Returning to flowchart 200 of FIG. 2, environment monitor 150 may label the training data (step 204). When applicable, e.g., if not already labeled, environment monitor 150 may label/annotate the training data by tagging raw data with correct answers to run supervised machine learning. Here, the labels may indicate whether the data is indicative of a lack of an object in motion, an object in motion, and characteristics of the object and the motion. The characteristic may include object tracking, speed, size, shape, material, etc. Through the process of training, the model learns to recognize patterns in new data and correctly predict motions based on the labels.

In addition to enriching the training data with meaningful tags (labels), the training data is preprocessed to achieve better prediction accuracy (step 206). In embodiments, environment monitor 150 may preprocess the received signals using techniques such as noise removal and feature enhancement. Environment monitor 150 may further perform filtering, amplification, and other signal conditioning techniques as needed. In embodiments, the preprocessing may additionally include a framing process that segments the continuous stream of sound into short pieces (frames) of the same length (typically, of 20-40 ms) for further segment-wise processing. Environment monitor 150 may further preprocess the training data by windowing, which minimizes spectral leakage. Lastly, the preprocessing may additionally include overlap-add (OLA) which prevents losing vital information that can be caused by windowing. Depending on the data, environment monitor 150 may further implement other preprocessing techniques, as well.

Once the training data is preprocessed, environment monitor 150 may extract features from the preprocessed training data (step 208). Audio features (or descriptors) are properties of signals, computed from visualizations of preprocessed audio data. With reference now to FIG. 7, the audio features can belong to one of three domains: time domain represented by waveforms (702), frequency domain represented by spectrum plots (704), and time and frequency domain represented by spectrograms (706). The extracted features may include changes in amplitude, frequency, phase, etc. The features may further include time domain (or temporal features) extracted directly from original waveforms. The features may further include an amplitude envelope (AE) that traces amplitude peaks within the frame and shows how they change over time, which can also measure the duration of distinct parts of a sound. The features may further include a root mean square energy (RMSE) that provides an understanding of the average energy of the signal, which can be computed from a waveform or a spectrogram. RMSE is particularly useful for audio segmentation and music genre classification. The features may further include a zero-crossing rate (ZCR) that counts how many times the signal wave crosses the horizontal axis within a frame. It's one of the most important acoustic features, widely used to detect the presence or absence of speech as well as differentiate noise from silence and music from speech.

Having extracted the features, environment monitor 150 may now select an algorithm for application to the extracted features (step 210). Environment monitor 150 may apply an algorithm to the extracted features to generate the model that correlates the labelled motion and characteristics thereof with the corresponding soundwave characteristics (or signatures). Since audio features typically come in the visual form (mostly as spectrograms), they are typically an object of image recognition algorithms that rely on deep neural networks. There are several popular architectures showing good results in sound detection and classification. For example, long short-term memory networks (LSTMs) are recurring neural networks (RNN) known for their ability to spot long-term dependencies in data and remember information from numerous prior steps. In addition, Convolutional neural networks (CNNs) lead the pack in computer vision in healthcare and other industries. They are often referred to as a natural choice for image recognition tasks. In embodiments, environment monitor 150 may select LSTMs, CNNs, alternative pattern recognition algorithms, or a combination thereof for application to the extracted features to generate the model.

Environment monitor 150 may input the training data into the selected algorithm to generate the model (step 212). The model may correlate the labelled motions and characteristics thereof with the soundwave signatures/characteristics such that, provided new soundwave characteristics, environment monitor 150 may infer a corresponding motion (or lack thereof) and characteristics thereof. As noted above, the model may be trained prior to implementation and further finetuned during implementation, where the finetuning may further an accuracy of the model based on the environment, for example due to a size/shape, acoustics, obstacles, etc. Environment monitor 150 may finetune the model using techniques such as backpropagation or a feedback loop. For example, after identifying motion from an object having specific characteristics, environment monitor 150 may determine and reduce an error between the identified motion and the actual motion. The feedback loop may involve, for example, environment monitor 150 activating additional sensors, such as cameras, upon initial motion detection. The data collected by the additional sensors may then be compared to that identified by audio signals to measure an accuracy of the audio-based detection. This process may result in more accurately identifying motion based on the characteristics of an environment and moving objects within.

Figure 3:
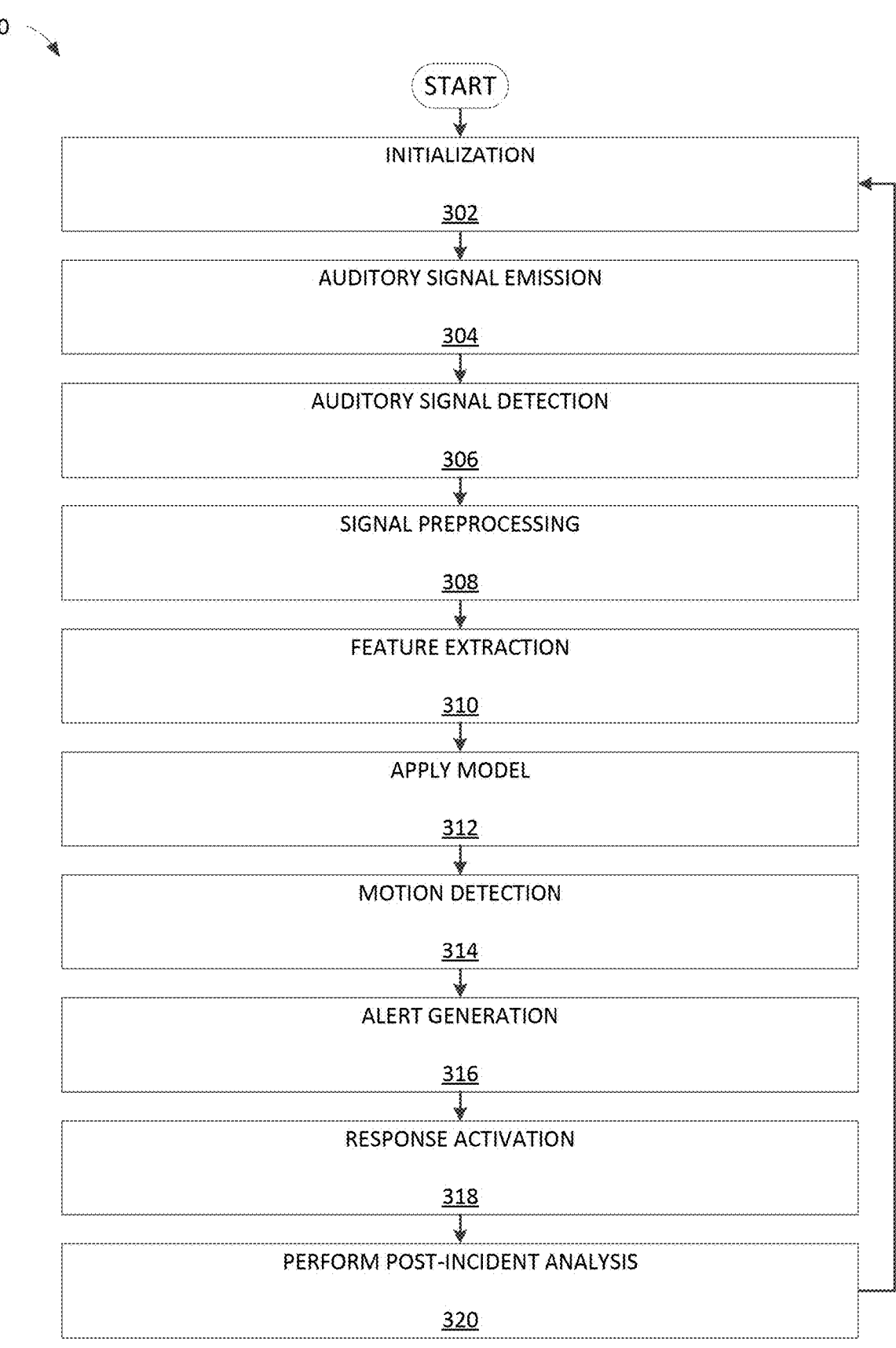
FIG. 3 depicts an exemplary flowchart 300 illustrating an implementation phase of environment monitor 150 of computing environment 100, in accordance with the exemplary embodiments.

Reference is now made to flowchart 300 depicted by FIG. 3 detailing the implementation phase of environment monitor 150.

Having generated the model, environment monitor 150 may now enter an implementation phase. It should be noted that while the embodiment described by the detailed description includes a training phase, in other embodiments, environment monitor 150 may skip a preliminary training phase and be trained during implementing on the fly. Depending on a configuration by an administrator or user, the implementation phase may consist of environment monitor 150 performing active monitoring of an environment. The monitoring may include detecting object motion within the environment and providing corresponding characteristics thereof, such as presence, location, movement, size, shape, material/composition, etc.

Figure 4:
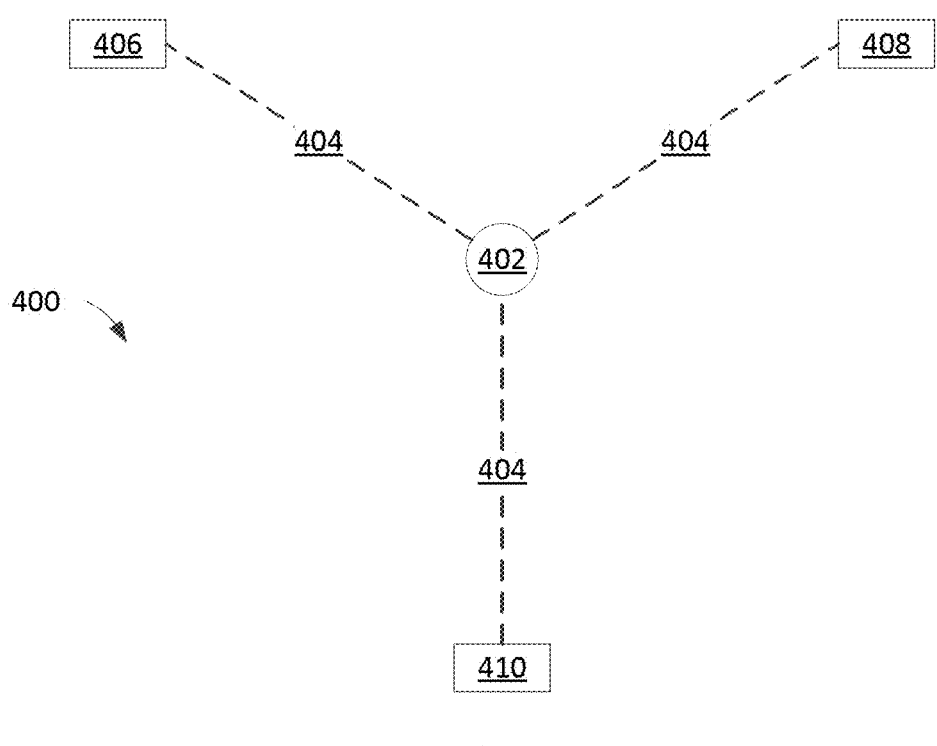
FIG. 4 depicts an example emitter and detector configuration within an environment, in accordance with the exemplary embodiments.

Environment monitor 150 may be initialized (step 302). Environment monitor 150 may be initialized within an environment in which monitoring is desired, which as noted above may include the installation of one or more physical devices and corresponding software. Installation of the one or more physical devices may include the strategical placement of one or more sound emitters and one or more sound detectors within the environment. The strategic placement may further the goals of complete coverage of the environment, reduced obstructions, improved performance, etc. For example, FIG. 4 depicts environment 400 in which a sound detector 402 is positioned equidistant between sound emitters 406, 408, and 410, each emitting audio signals 404. An alternative configuration may include a sound emitter 402 emitting audio signals 404 towards equidistantly positioned sound detectors 406, 408, and 410. It will be appreciated that various configurations of sound emitters and sound detectors are contemplated by the present invention and may be preferred/required based on application, including various ratios of emitters to detectors, various spacing between emitters/detectors, etc.

Moreover, because soundwaves may bounce between surfaces, no line of sight is required between emitter and detector. As such, while fewer obstructions may be preferable, the physical devices may nonetheless be installed practically anywhere, such as on ground level or fixed to walls/ceilings, etc. While the emitters and detectors may function from many different locations within the environment, it should be noted that any repositioning of initialized emitters and detectors may require additional training and/or tuning of the model. During implementation, environment monitor 150 may create a mapping of and assign unique identifiers to each of the initialized emitters and detectors such that their relative locations are known. This may allow for environment monitor 150 to determine a location of motion relative to locations of the emitters and detectors. Furthermore, while moving object distance, speed, shape, and size may all be calculated from an envelope of a soundwave alone, it is noted that knowing the relative locations of sound emitters and detectors may allow for the additional use of techniques such as trilateration, triangulation, etc. when identifying the location of an object within the environment.

In addition to distinguishing the emitters and detectors via unique identifiers, so too may their emitted signals be distinguished by unique identifiers. The emissions from each unique emitter may be made unique by, for example, emitting a different frequency, emitting a unique identifying sound along with the sound emissions, etc. By identifying an originating location of detected sound emissions, environment monitor 150 may not only be more accurate, but may be capable of tracking moving objects within the environment (see, e.g., FIG. 5). The initializing may further include selection of appropriate audible and inaudible sound frequencies emitted by the sound emitters. The audible frequency may be, for example 2 Hz and up (to, e.g., 20 kHz) while the inaudible frequency may be infrasound at less than 2 Hz, i.e., low frequency sound. Initialization may further include scheduling the soundwave emissions based on time, orientation, location, etc. The scheduling may be specific to the environment and preferences of an administrator of the system, for example settings indicative of which emitters from which to emit soundwaves, how often to emit the soundwaves, which detectors at which to detect the soundwaves, timings thereof, etc. As such, the scheduling may be use-case specific and determined on a case-by-case basis.

In addition to the installation of one or more physical devices, initialization of environment monitor 150 may further include installation of software working in tandem with the physical devices. The software may provide instruction to and receive data from the physical devices, as well as provide a graphical user interface (GUI) for a user to interact with the software. The software may include the model generated with respect to flowchart 200 which, as previously described, may be installed as a foundational motion detection model that is henceforth finetuned to the specific environment in which system is implemented. The finetuning may increase an accuracy of the system based on environmental conditions such as size, layout, acoustics, air composition, etc. As noted above, the software may be installed locally or remotely, and be configured to notify onsite/offsite personnel/machinery of detected motion. Moreover, the configuration may further specify for which detected objects in motion notifications are desired, for example motion identified as an individual as opposed to motion identified as a machine.

Environment monitor 150 may emit auditory signals (step 304). In embodiments, environment monitor 150 may begin monitoring an environment by emitting the inaudible and/or audible auditory signals. Environment monitor 150 may emit the auditory signals from the strategically placed sound emitters in the frequencies and at the schedules selected during the initialization previously described. Alternatively (or in addition), environment monitor 150 may implement passive detection in which the noises emitted from devices within the environment are used for motion detection analysis, such as a hum of a computing device, machinery, fans, lighting, etc. In embodiments implementing passive detection, environment monitor 150 may forego the use of one or more sound emitters and use the noises emitted by the environment devices instead. Example soundwave emissions are illustrated by environment 500 of FIG. 5 in which a sound emitter 502 emits soundwaves 504 towards sound detectors 506, 508, 510, and 512. Arrow 514 depicts motion through the environment 500 first detected by sound detector 506, then 508, and lastly 510, enabling the tracking of objects based on the mapped locations of the physical devices. In embodiments, an acoustic transducer may produce the audible and inaudible sound emissions, for example a loudspeaker or ultrasonic emitter. The emitter(s) may emit the soundwaves for durations configured during initialization.

The emitted soundwaves travel through the air of the environment as longitudinal pressure waves alternating between compressions and rarefactions of air particles. When the soundwaves hit a stationary object or a moving object enters the path of the soundwaves, they interact with the objects through reflection, scattering, absorption, and attenuation. When an object crosses the path of the emitted soundwaves, the objects act as an obstacle, causing the soundwaves to reflect and scatter in various directions. The shape, size, and material properties of the object, as well as clothing and any carried objects in the case of people, will influence the reflection and scattering patterns. In addition, as the soundwaves interact with the object, some of the soundwave energy will be absorbed, resulting in attenuation or reduction of the soundwave amplitude. The degree of absorption depends on the frequency of the soundwaves and the material properties of the object and any effects. In cases where the object is moving, the Doppler effect may come into play where the frequency of the reflected soundwaves will change based on the relative velocity between the person and the detector. This frequency shift can provide information about the person's speed and direction (see, e.g., FIG. 6). Patterns of this phenomena were captured by the model and associated with corresponding object motion during the training phase such that now object motion can be predicted based on receiving the patterns alone.

Environment monitor 150 may detect the auditory signals (step 306). In embodiments, environment monitor 150 may detect the audible and inaudible auditory signals emitted by the sound emitters at the sound detectors. The detectors capture the reflected and scattered soundwaves and may be, for example, a microphone or ultrasonic sensor. Like the sound emitters, the sound detectors may be differentiated by a unique identifier and mapped to the environment in which they are implemented.

Environment monitor 150 may perform signal preprocessing on the detected soundwaves (step 308). In embodiments, environment monitor 150 may preprocess the received signals in a manner similar to that described by flowchart 200 with respect to the training phase of environment monitor 150.

Environment monitor 150 may extract features from the processed data (step 310). In embodiments, environment monitor 150 may extract features in a similar manner to that described by flowchart 200 with respect to the training phase of environment monitor 150.

Environment monitor 150 may apply the model (step 312). Environment monitor 150 may apply the model to the extracted features to determine whether motion is detected. Using the model and features, environment monitor 150 may be capable of identifying multiple moving objects within the environment as well as characteristics thereof. In addition, environment monitor 150 may be performed iteratively to further allow for the tracking of a same object within the environment over time. Environment monitor 150 may further learn from the data, for example via a feedback loop, and adapt the model to changes in the environment, thereby improving its performance over time.

Environment monitor 150 may detect motion (step 314). Based on application of the model, environment monitor 150 may detect motion of one or more objects within the environment. Environment monitor 150 may detect the motion based on the model outputting a value indicating that the currently processed data is sufficiently similar to what the model is historically trained to associate with motion of a particular object. The comparison may be, for example, confidence threshold based. The motion detection may further include characteristics of the detected motion, for example a size, shape, material, clothing, etc. of an object in motion or at rest within the environment.

Environment monitor 150 may generate an alert (step 316). Environment monitor 150 may relay information about the environment to an administrator, including a location, movement, and characteristics of object(s). The information may be output in various formats, such as maps or real-time tracking data. This information can be displayed on a user interface, integrated into other systems, or used for decision-making in different applications. In embodiments, an administrator or user of environment monitor 150 may configure for which objects and motion alerts are desired, for example alerts for human- or animal-based motion only.

Environment monitor 150 may activate a response (step 318). Based on the generated alert, environment monitor 150 may activate a response. The response may include, for example, the activation of additional sensors (e.g., brief activation of more detailed yet less efficient cameras/lights), investigation of the environment/specific area thereof, the deployment of personnel/machinery, etc. Motion preliminarily detected by environment monitor 150 may, for example, trigger a first level response in which additional sensors are activated, such as lights and cameras, where each level of response may provide additional details at the expense of added resource cost. Having gathered additional information in the first level response, environment monitor 150 may proceed to updating any generated alerts and/or escalating the response to a higher level when applicable. For example, if an intrusion is confirmed by a response level, a next level response may include dispatching personnel or machinery to investigate.

Environment monitor 150 may perform a post-incident analysis (step 320). Environment monitor 150 may log the detected motion for future reference, for example subsequent model improvement or pattern recognition analysis on motion detection data to identify trends.

FIG. 4 depicts an example emitter and detector configuration within an environment, in accordance with the exemplary embodiments.

Figure 5:
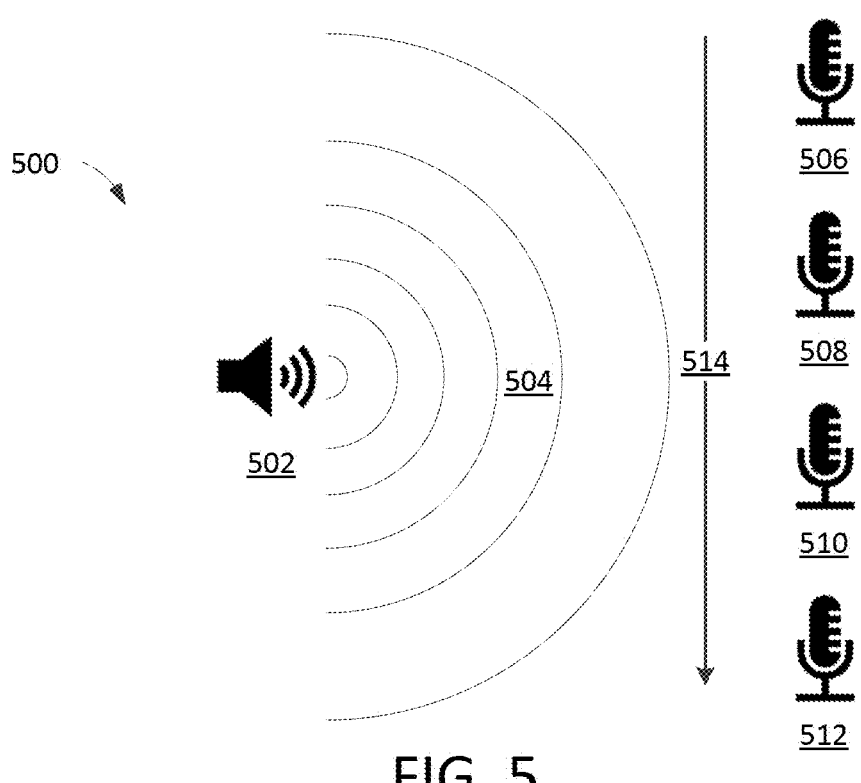
FIG. 5 depicts an example emission from an emitter to detectors, in accordance with the exemplary embodiments.

FIG. 5 depicts an example emission from an emitter to detectors, in accordance with the exemplary embodiments.

FIG. 6A-6B depict spectrum analyses of motion detected between an emitter and a detector, in accordance with the exemplary embodiments.

Figure 7A:
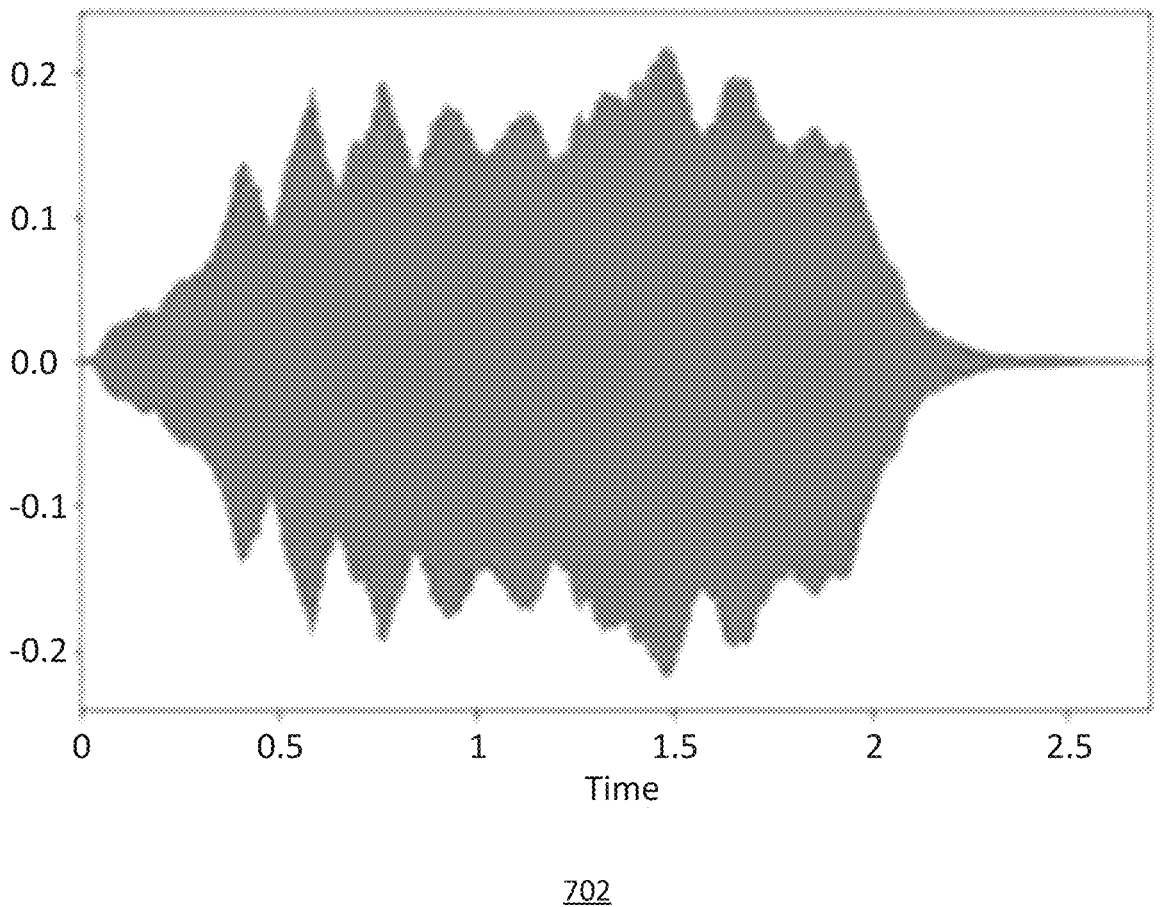
FIG. 7A-7C depict domains of audio features, in accordance with the exemplary embodiments.
Figure 7B:
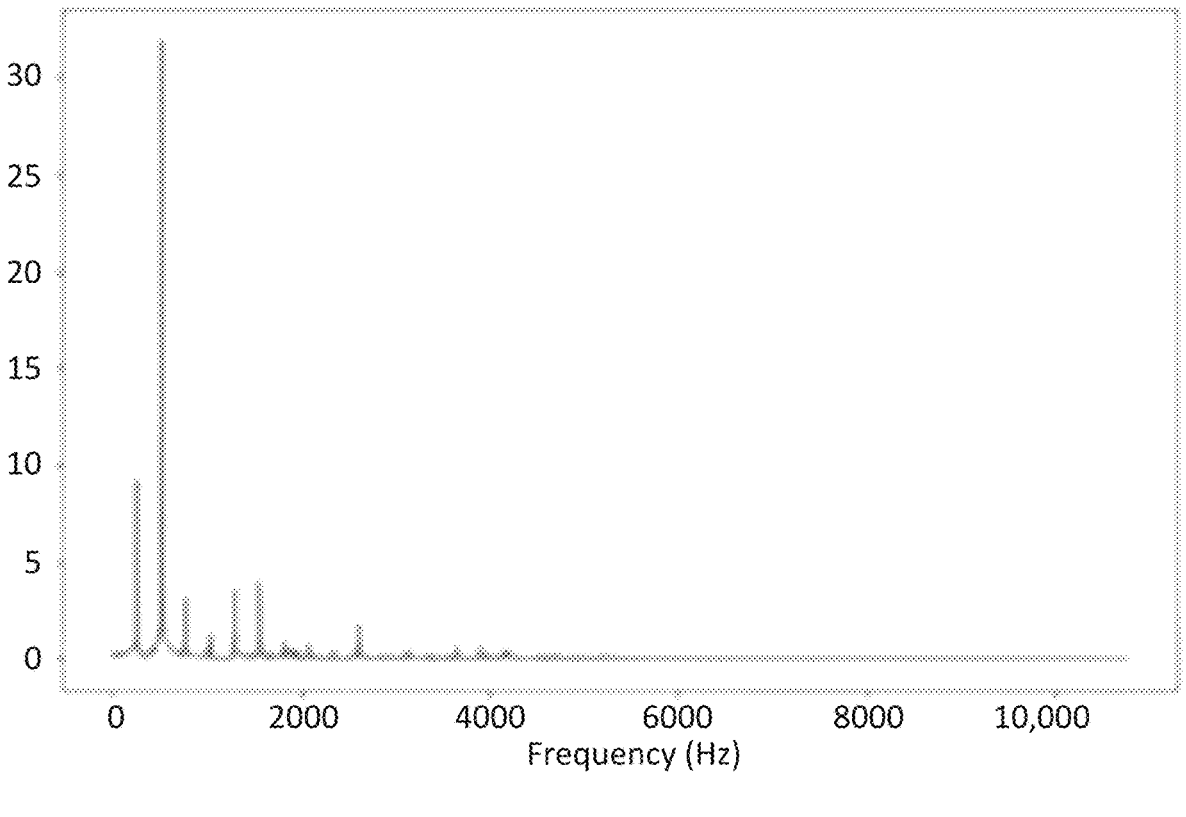
Figure 7C:
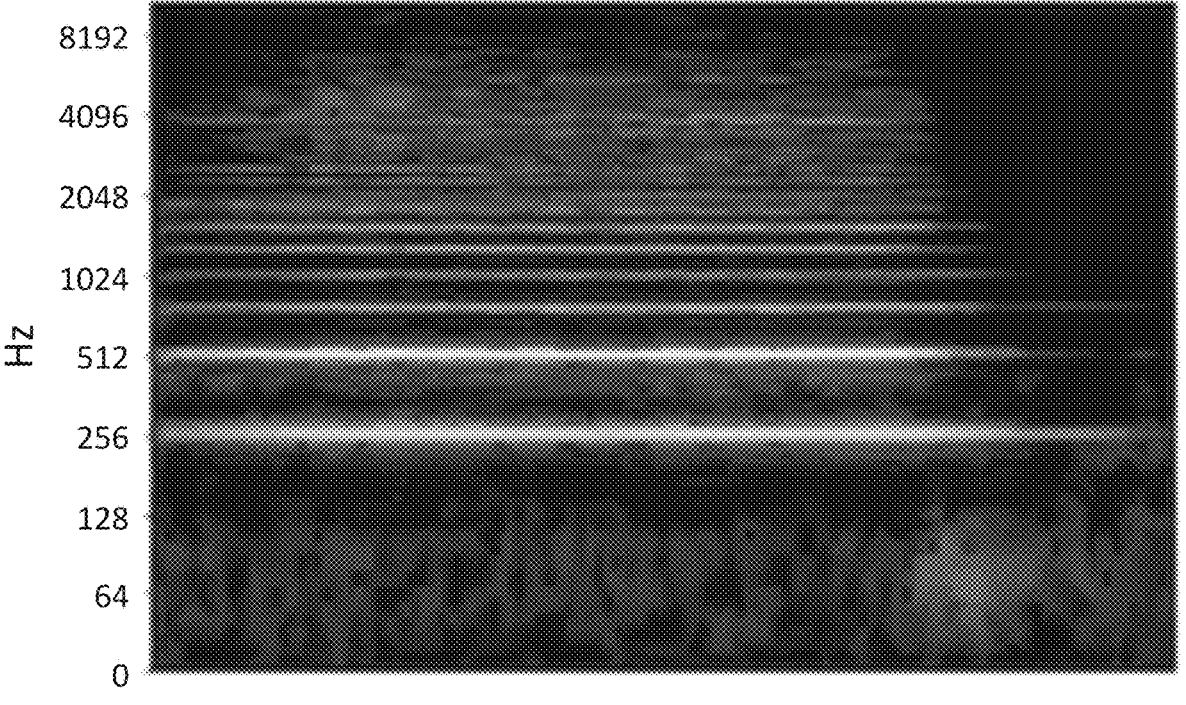

FIG. 7A-7B depict domains of audio features, in accordance with the exemplary embodiments.

15

What is claimed is:

1. A computer-implemented method for environment monitoring, the computer-implemented method comprising:
   emitting one or more soundwaves within an environment, wherein the one or more soundwaves are infrasonic;
   detecting the emitted one or more soundwaves;
   identifying motion of an object within the environment based on an analysis of the detected one or more soundwaves; and
   tracking a location of the object over time.

2. The computer-implemented method of claim 1, wherein the analysis further comprises:
   identifying at least one of a size, shape, and composition of the object.

3. The computer-implemented method of claim 1, further comprising:
   activating a response to the motion.

4. The computer-implemented method of claim 1, wherein the one or more soundwaves further include audible soundwaves.

5. The computer-implemented method of claim 1, wherein the analysis includes application of a model, and wherein the model associates one or more features of the one or more soundwaves with the motion and the object.

6. The computer-implemented method of claim 5, wherein the one or more features include changes in amplitude, changes in frequency, changes in phase, temporal features extracted directly from the one or more soundwaves, an amplitude envelope (AE), a root mean square energy (RMSE), and a zero-crossing rate (ZCR).

7. A computer system for environment monitoring, the computer system comprising:
   one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, the computer system performing a method comprising:
   emitting one or more soundwaves within an environment, wherein the one or more soundwaves are infrasonic;
   detecting the emitted one or more soundwaves;
   identifying motion of an object within the environment based on an analysis of the detected one or more soundwaves; and
   tracking a location of the object over time.

8. The computer system of claim 7, wherein the analysis further comprises:
   identifying at least one of a size, shape, and composition of the object.

9. The computer system of claim 7, further comprising:
   activating a response to the motion.

10. The computer system of claim 7, wherein the one or more soundwaves further include audible soundwaves.

11. The computer system of claim 7, wherein the analysis includes application of a model, and wherein the model associates one or more features of the one or more soundwaves with the motion and the object.

12. The computer system of claim 11, wherein the one or more features include changes in amplitude, changes in frequency, changes in phase, temporal features extracted directly from the one or more soundwaves, an amplitude envelope (AE), a root mean square energy (RMSE), and a zero-crossing rate (ZCR).

13. A computer program product for environment monitoring, the computer program product comprising:
   a computer-readable storage medium having program instructions embodied therewith, the program instructions executable by a processor to cause the processor to perform a method comprising:
   emitting one or more soundwaves within an environment, wherein the one or more soundwaves are infrasonic;
   detecting the emitted one or more soundwaves;
   identifying motion of an object within the environment based on an analysis of the detected one or more soundwaves; and
   tracking a location of the object over time.

14. The computer program product of claim 13, wherein the analysis further comprises:
   identifying at least one of a size, shape, and composition of the object.

15. The computer program product of claim 13, further comprising:
   activating a response to the motion.

16. The computer program product of claim 13, wherein the one or more soundwaves further include audible soundwaves.

17. The computer program product of claim 13, wherein the analysis includes application of a model, and wherein the model associates one or more features of the one or more soundwaves with the motion and the object.

* * * * *